(12) United States Patent
Lee et al.

(10) Patent No.: US 7,165,142 B2
(45) Date of Patent: Jan. 16, 2007

(54) DATA STORAGE ARRAY LINKING OPERATION SWITCHING CONTROL SYSTEM

(75) Inventors: Chun-Liang Lee, Taipei (TW); Chih-Hung Kuo, Taipei (TW)

(73) Assignee: Inventec Corporation, Taipei (TW)

( * ) Notice: Subject to any disclaimer, the term of this patent is extended or adjusted under 35 U.S.C. 154(b) by 476 days.

(21) Appl. No.: 10/792,973

(22) Filed: Mar. 3, 2004

(65) Prior Publication Data

US 2005/0198435 A1 Sep. 8, 2005

(51) Int. Cl.
*G06F 13/20* (2006.01)

(52) U.S. Cl. ........................ 711/114; 709/238
(58) Field of Classification Search ............... 711/114
See application file for complete search history.

(56) References Cited

U.S. PATENT DOCUMENTS 6,983,343 B1 * 1/2006 van Cruyningen .......... 710/316

2004/0024962 A1 * 2/2004 Chatterjee et al. .......... 711/114

* cited by examiner

*Primary Examiner*—David L. Robertson
*Assistant Examiner*—Hamdy Ahmed
(74) *Attorney, Agent, or Firm*—Fulbright & Jaworksi L.L.P.

(57) ABSTRACT

A data storage array linking operation switching control system is proposed, which is designed for use in conjunction with an array-type data storage device that is composed of a plurality of data storage unit and associated with at least two data access channels, with the capability of selectively switching the linking between the data storage units and the data access channels for the purpose of providing various linking modes of different utilization objectives with hot spare capability, including a backup linking mode, a partitioned linking mode, and a high-performance linking mode. This capability allows the array-type data storage device to be set to different linking modes based on different utilization objectives, which allows the system management of network servers to be more flexible in application.

11 Claims, 5 Drawing Sheets

DATA STORAGE ARRAY LINKING OPERATION SWITCHING CONTROL SYSTEM

BACKGROUND OF THE INVENTION

1. Field of the Invention

This invention relates to data storage technology, and more particularly, to a data storage array linking operation switching control system which is designed for use in conjunction with an array-type data storage device, such as an array of FC HDD (Fibre Channel Hard Disk Drive) units or a RAID (Redundant Array of Independent Disks) device, that is associated with at least two data access channels, with the capability of selectively switching the linking between the data storage units and the data access channels for the purpose of providing various linking modes of different utilization objectives, including a backup linking mode, a partitioned linking mode, and a high-performance linking mode.

2. Description of Related Art

Network servers typically are installed to handle a very great amount of data that flow through the network system. For this reason, a network server is typically equipped with high-capacity data storage devices, such as an array of FC HDD (Fibre Channel Hard Disk Drive) units, a RAID (Redundant Array of Independent Disks) device, or the like, so as to be capable of storing the vast amount of data that are to be served or stored through the network system. In such an array-type data storage device, each of the individual data storage unit is capable of independent operation for data access, and each is capable of being accessed via two or more data access channels.

In the application of the above-mentioned array-type data storage device, it is usually required to be capable of providing a backup capability that allows any failed data storage unit to be promptly replaced by another good and operable data storage unit, or any failed data access channel to be replaced by another data access channel, so as to allow the array-type data storage device to be always accessible by the network server all the time.

SUMMARY OF THE INVENTION

It is therefore an objective of this invention to provide a data storage array linking operation switching control system which allows an array-type data storage device to be based on different utilization objectives to be set to different linking modes with hot spare capability, including a backup linking mode, a partitioned linking mode, and a high-performance linking mode.

The data storage array linking operation switching control system according to the invention is designed for use in conjunction with an array-type data storage device, such as an array of FC HDD (Fibre Channel Hard Disk Drive) units or a RAID (Redundant Array of Independent Disks) device, that is associated with at least two data access channels, with the capability of selectively switching the linking between the data storage units and the data access channels for the purpose of providing various linking modes of different utilization objectives with hot spare capability, including a backup linking mode, a partitioned linking mode, and a high-performance linking mode.

The data storage array linking operation switching control system according to the invention is advantageous to use in that it allows the array-type data storage device to be set to different linking modes based on different utilization objectives, which allows the system management of network servers to be more flexible in application.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The data storage array linking operation switching control system according to the invention the invention is disclosed in full details by way of preferred embodiments in the following with reference to the accompanying drawings.

Figure 1:
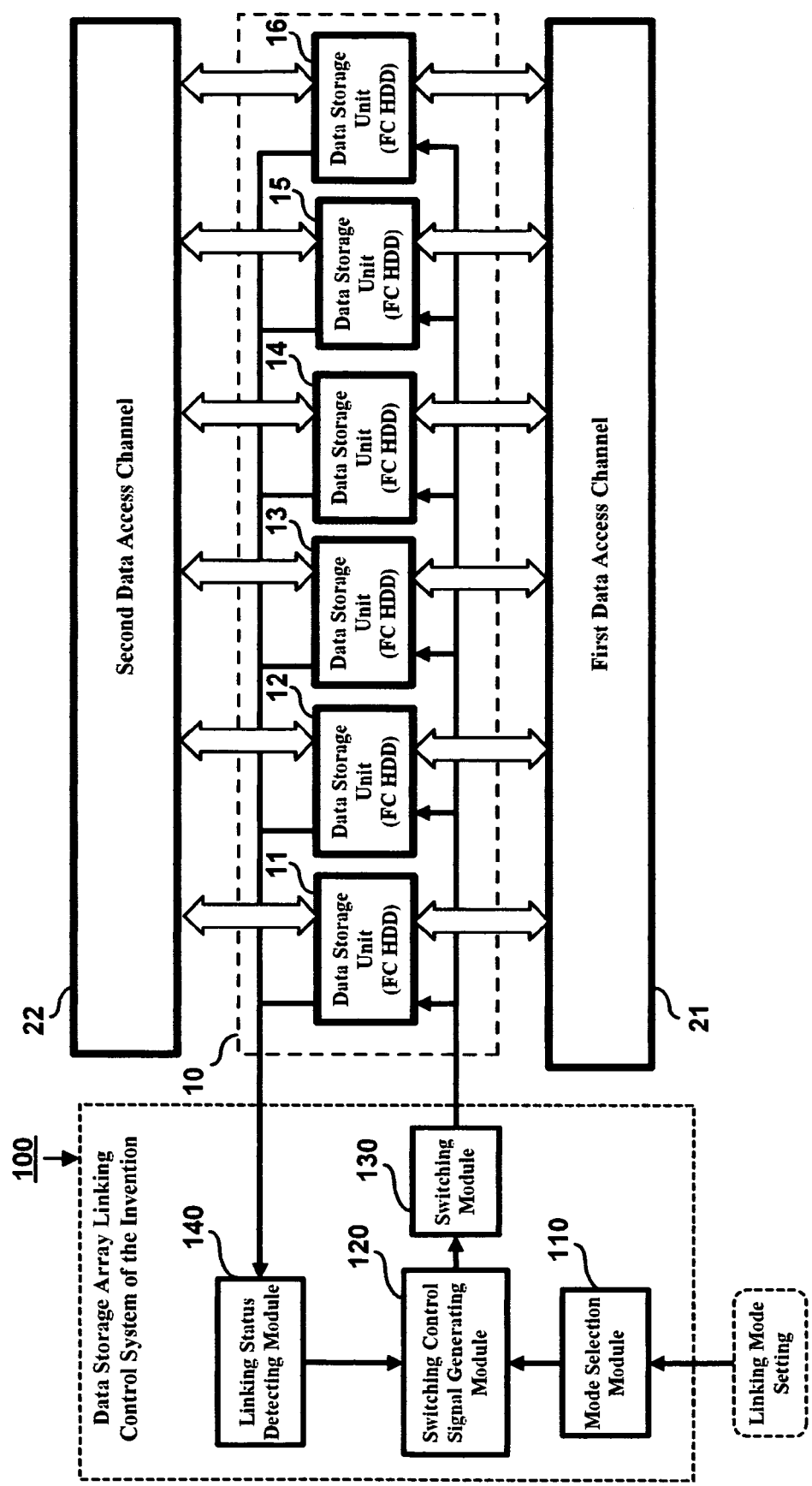
FIG. 1 is a schematic diagram showing the application architecture and object-oriented component model of the data storage array linking operation switching control system according to the invention.

FIG. 1 is a schematic diagram showing the application architecture and object-oriented component model of the data storage array linking operation switching control system according to the invention (as the part enclosed in the dotted box indicated by the reference numeral 100). As shown, the data storage array linking operation switching control system of the invention 100 is designed for use in conjunction with an array-type data storage device 10 that is composed of a plurality of data storage units (for example, 6 data storage units 11, 12, 13, 14, 15, 16 in the embodiment of FIG. 1, but in practice the number of data storage units is unrestricted and dependent on the capacity of the array-type data storage device 10) and connected to at least two data access channels including a first data access channel 21 and a second data access channel 22, with the capability of selectively switching the linking between the data storage units 11, 12, 13, 14, 15, 16 in the array-type data storage device 10 and the data access channels 21, 22 for the purpose of providing an intended linking mode selected from the group including a first linking mode (hereinafter referred to as "backup linking mode"), a second linking mode (referred to as "partitioned linking mode"), and a third linking mode (referred to as "high-performance linking mode").

Figure 2A:
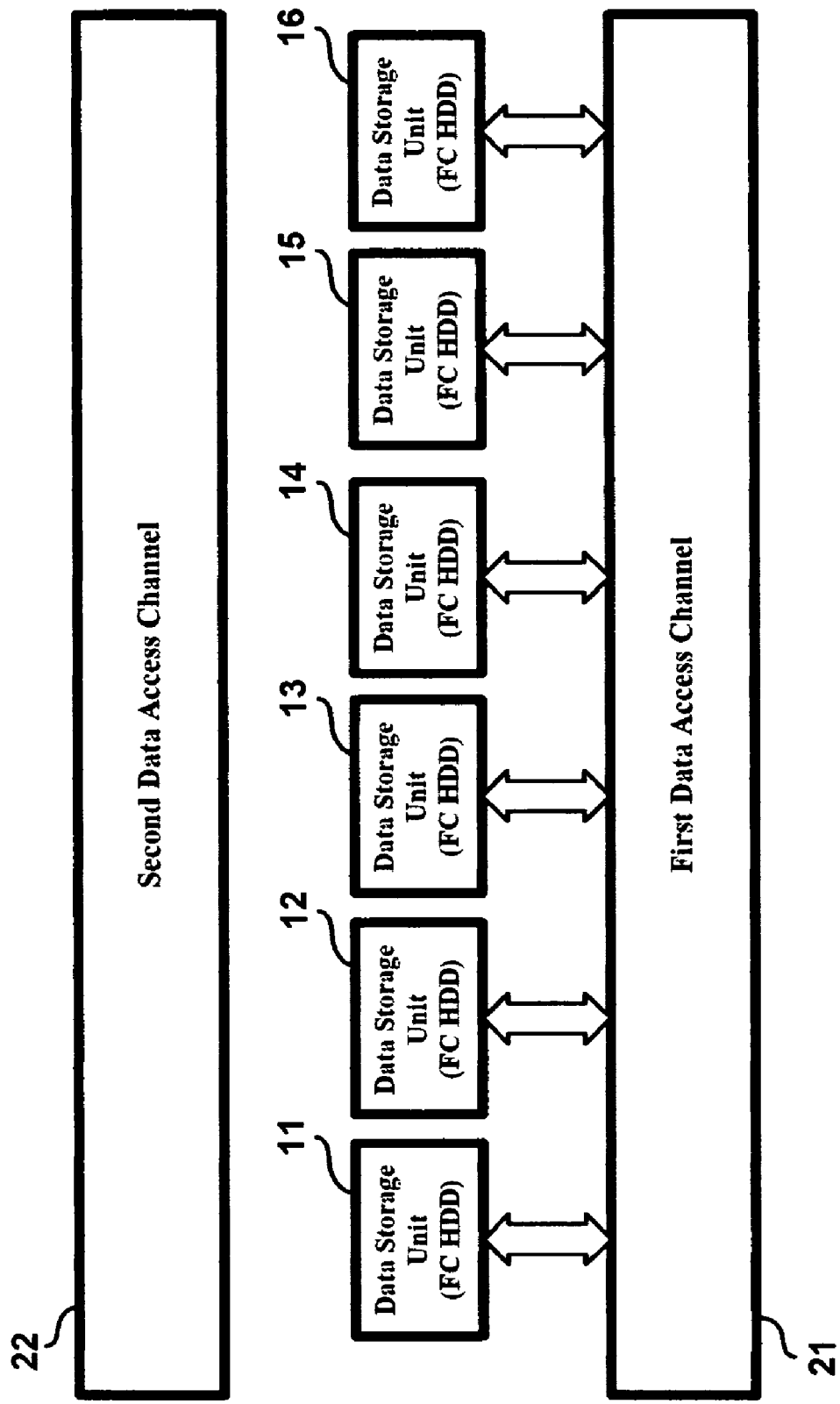
FIG. 2A is a schematic diagram showing an example of an array-type data storage device being switched to the backup linking mode by the data storage array linking operation switching control system of the invention.

As depicted in FIG. 2A, the backup linking mode is used to link all the data storage units 11, 12, 13, 14, 15, 16 in the array-type data storage device 10 solely to the first data access channel 21, but not to the second data access channel 22 (in this case, the second data access channel 22 is used to serve as a backup to the first data access channel 21).

When the linking between the first data access channel 21 and any one of the data storage units 11, 12, 13, 14, 15, 16 fails or the access channel trace is broken (i.e., abnormally disconnected), the data storage array linking operation switching control system of the invention 100 will promptly detect this condition and redirect the linking of the abnormally-linked one of the data storage units (11, 12, 13, 14, 15, or 16) to the second data access channel 22.

Figure 2B:
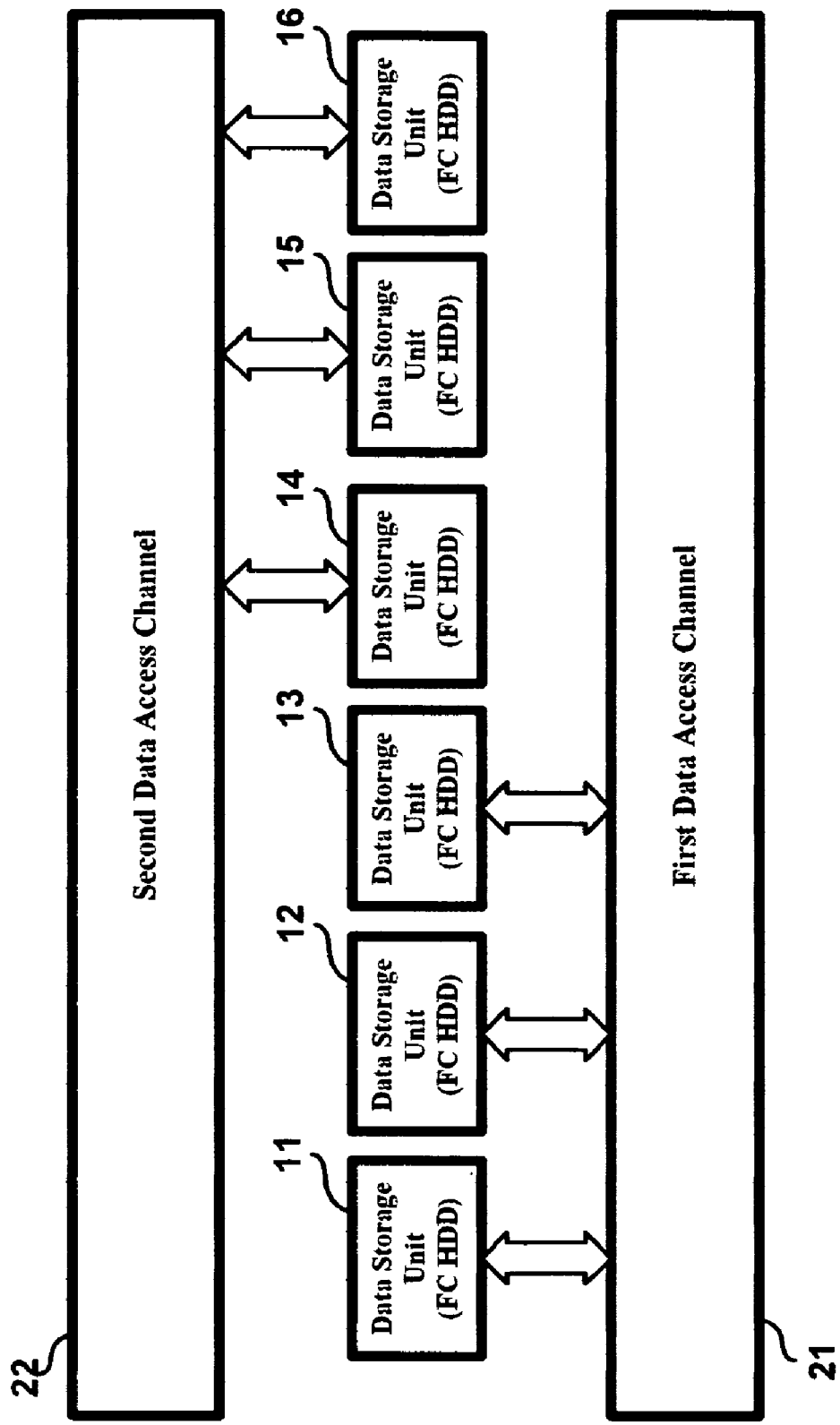
FIG. 2B is a schematic diagram showing an example of an array-type data storage device being switched to the partitioned linking mode by the data storage array linking operation switching control system of the invention.

As depicted in FIG. 2B, the partitioned linking mode is used to link a subgroup of all the data storage units 11, 12, 13, 14, 15, 16 in the array-type data storage device 10 (for example the first 3 data storage units 11, 12, 13) to the first data access channel 21, and a second subgroup of the same (for example the other 3 data storage units, 14, 15, 16) to the second data access channel 22. The first data access channel 21 and the second data access channel 22 are independent from each other and serve as backup to each other, and the array-type data storage device 10 can be accessed concurrently via the first data access channel 21 and the second data access channel 22. When the linking between the first data access channel 21 and any one of the first subgroup of data storage units 11, 12, 13 fails (i.e., abnormally disconnected), the data storage array linking operation switching control system of the invention 100 will promptly detect this condition and redirect the linking the abnormally-linked one of the data storage units (11, 12, or 13) to the second data access channel 22; and vice versa, when the linking between the second data access channel 22 and any one of the second subgroup of data storage units 14, 15, 16 fails, the data storage array linking operation switching control system of the invention 100 will also promptly detect this condition and redirect the linking of the abnormally-linked one of the data storage units (14, 15, or 16) to the first data access channel 21.

Figure 2C:
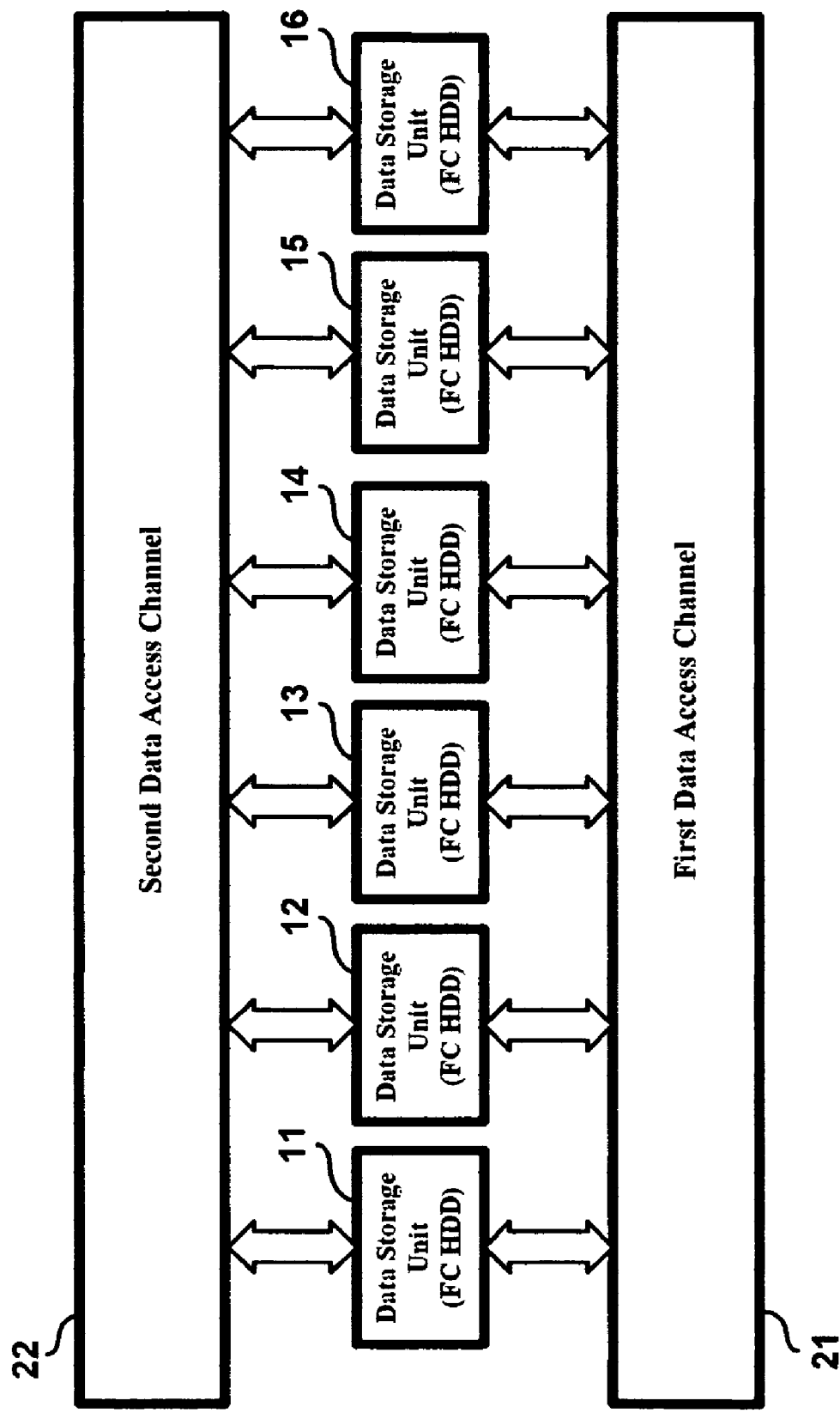
FIG. 2C is a schematic diagram showing an example of an array-type data storage device being switched to both access channels to achieve the high performance linking mode by the data storage array linking operation switching control system of the invention.

As depicted in FIG. 2C, the high-performance linking mode is used to link all of the data storage units 11, 12, 13, 14, 15, 16 in the array-type data storage device 10 concurrently to both the first data access channel 21 and the second data access channel 22, allowing external network server (not shown) to gain access to the same one of the data storage units 11, 12, 13, 14, 15, 16 concurrently via the first data access channel 21 and the second data access channel 22. This linking mode provides the highest performance of data access to the array-type data storage device 10.

In addition, the above linking mode are capable of providing a hot-spare capability, by which a spare data storage unit is additionally installed but unconnected to the active access channel, and in the event of one of the data storage units 11, 12, 13, 14, 15, 16 fails, the data storage array linking operation switching control system of the invention 100 will promptly connect the spare data storage unit to the active data access channel, and transfer the data in the failed data storage unit to the spare data storage unit, so that the external network server (not shown) can nevertheless gain access to the data that were previously stored in the failed data storage unit.

In practice, the array-type data storage device 10 can be, for example, an array of FC HDD (Fibre Channel Hard Disk Drive) units, or a RAID (Redundant Array of Independent Disks) device. Further, the linking operation mode configuration is compliant with the standard IPMI (Intelligent Platform Management Interface) data communication protocol for connection to external network servers (not shown), which allows the external network servers to configure the linking operation mode via the IPMI. Since FC, RAID, and IPMI are well-known and widely-used standards in the IT (information technology) industry, detailed description thereof will not be given in this specification.

As shown in FIG. 1, the internal architecture of the data storage array linking operation switching control system of the invention 100 comprises: (a) a mode selection module 110; (b) a switching control signal generating module 120; and (c) a switching module 130; and can further comprise a linking status detecting module 140.

The mode selection module 110 can be user-operated for the user to specify a desired linking mode for the linking between the array-type data storage device 10 and the two data access channels 21, 22, i.e., backup linking mode, partitioned linking mode, or high-performance linking mode. In addition, the mode selection module 110 can also be event-driven, i.e., driven by an internal event issued from a network server (not shown) to select the desired linking mode based on various conditions in actual operation.

The switching control signal generating module 120 is capable of being activated in response to the selection made by the mode selection module 110 to generate a set of corresponding switching control signals based on the linking mode selected by the mode selection module 110, and then transfer these switching control signals to the switching module 130.

The switching module 130 can be for example implemented with a logic circuit, which is connected to each of the data storage units 11, 12, 13, 14, 15, 16 in the array-type data storage device 10, and which is capable of being activated in response to the switching control signals from the switching control signal generating module 120 to accordingly link the data storage units 11, 12, 13, 14, 15, 16 in the array-type data storage device 10 to either the first data access channel 21, or the second data access channel 22, or both, so as to operate in the selected linking mode. For example, if the mode selection module 110 selects backup linking mode, the switching module 130 will link all the data storage units 11, 12, 13, 14, 15, 16 in the array-type data storage device 10 to the first data access channel 21, but not to the second data access channel 22; if the mode selection module 110 selects partitioned linking mode, the switching module 130 will link a subgroup of all the data storage units 11, 12, 13, 14, 15, 16 in the array-type data storage device 10 (for example the 3 data storage units 11, 12, 13) to the first data access channel 21, and a second subgroup of the same (for example the other 3 data storage units, 14, 15, 16) to the second data access channel 22; and if the mode selection module 110 selects high-performance linking mode, the switching module 130 will link all of the data storage units 11, 12, 13, 14, 15, 16 in the array-type data storage device 10 concurrently to both the first data access channel 21 and the second data access channel 22.

Figure 3:
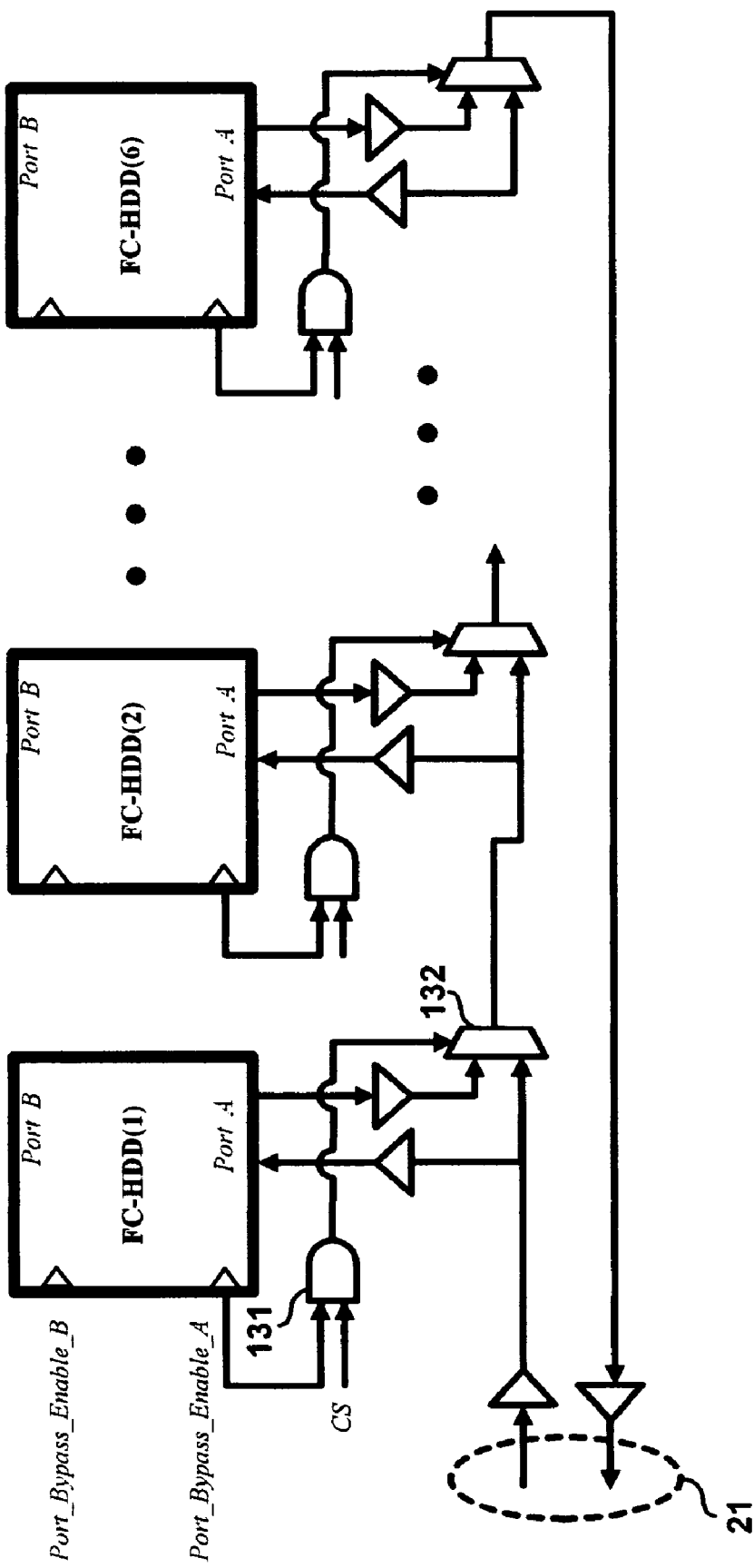
FIG. 3 is a schematic logic circuit diagram showing an example of the internal architecture of the switching module utilized by the data storage array linking operation switching control system of the invention.

FIG. 3 is a schematic logic circuit diagram showing a preferred embodiment of the internal structure of the switching module 130, which is specifically designed for use in conjunction with an array of FC HDD units, wherein each FC HDD unit is equipped with 3 connecting ports: Port A and Port B, which are respectively enabled for use by two enable signals: Port_Bypass_Enable_A and Port_Bypass_Enable_B; and each FC HDD unit is connectable via Port A and Port B respectively to the first data access channel 21 and the second data access channel 22 (for simplification of drawing, FIG. 3 only shows the linking of the FC HDD units to the first data access channel 21). In this preferred embodiment, for example, the switching module 130 includes the provision of an AND gate 131 and a multiplexer 132 for each FC HDD unit (the triangularly-shaped symbols in FIG. 3 represent buffers), wherein the AND gate 131 has a first input end connected to the Port_Bypass_Enable_A port of the associated FC HDD unit and a second input end connected to one of the switching control signals CS generated by the switching control signal generating module 120. Therefore, when Port_Bypass_Enable_A=1, the state of CS=1 will cause the FC HDD unit to be linked via the multiplexer 132 to the first data access channel 21; and the state of CS=0 will cause the FC HDD unit to be unlinked to the first data access channel 21. Beside the embodiment shown in FIG. 3, the internal architecture of the switching module 130 has various other alternatives. Since the linking between the second data access channel 22 and the FC HDD units is the same as the linking between the first data access channel 21 and the FC HDD units, detailed description thereof will not be repeated.

The linking status detecting module 140 is capable of detecting whether each of the data storage units 11, 12, 13, 14, 15, 16 in the array-type data storage device 10 is abnormally linked to one of the two data access channels 21, 22; and if yes, the linking status detecting module 140 is capable of promptly generating a backup switching enable message to the switching control signal generating module 120, causing the switching control signal generating module 120 to be activated to generate a corresponding set of switching control signals to activate the switching module 130 to switch each abnormally-linked one of the data storage units (11, 12, 13, 14, 15, or 16) from the currently-associated data access channel to the other one.

In conclusion, the invention provides a data storage array linking operation switching control system, which is designed for use in conjunction with an array-type data storage device that is composed of a plurality of data storage unit and associated with at least two data access channels, with the capability of selectively switching the linking between the data storage units and the data access channels for the purpose of providing various linking modes of different utilization objectives with hot spare capability, including a backup linking mode, a partitioned linking mode, and a high-performance linking mode. This capability allows the array-type data storage device to be set to different linking modes based on different utilization objectives, which allows the system management of network servers to be more flexible in application. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A data storage array linking operation switching control system for use in conjunction with an array-type data storage device composed of a plurality of data storage units and connected to at least two data access channels including a first data access channel and a second data access channel, with the capability of selectively switching the linking between the data storage units in the array-type data storage device and the data access channels for the purpose of providing an intended linking mode selected from the group including a first linking mode, a second linking mode, and a third linking mode, wherein the third linking mode provides a higher performance than the second linking mode, and the second linking mode provides a higher performance than the first linking mode;

the data storage array linking operation switching control system comprising:

a mode selection module, which is used to select a desired mode from the group of the first linking mode, the second linking mode, and the third linking mode; wherein the first linking mode links all the data storage units in the array-type data storage device solely to the first data access channel but not to the second data access channel; the second linking mode links a first subgroup of the data storage units in the array-type data storage device to the first data access channel and a second subgroup of the same to the second data access channel; and the third linking mode links all the data storage units in the array-type data storage device concurrently to both the first data access channel and the second data access channel;

a switching control signal generating module, which is capable of generating a set of switching control signals based on the selected linking mode by the mode selection module; and a switching module, which is connected to each of the data storage units in the array-type data storage device, and which is capable of being activated in response to the switching control signals from the switching control signal generating module to accordingly link the data storage units in the array-type data storage device to the first data access channel and the second data access channel so as to allow the array-type data storage device to operate in the selected linking mode.

2. The data storage array linking operation switching control system of claim 1, wherein the array-type data storage device is a RAID (Redundant Array of Independent Disks) device.

3. The data storage array linking operation switching control system of claim 1, wherein the array-type data storage device is an array of FC HDD (Fibre Channel Hard Disk Drive) units.

4. The data storage array linking operation switching control system of claim 1, wherein the first data access channel and the second data access channel are compliant with IPMI (Intelligent Platform Management Interface) standard.

5. The data storage array linking operation switching control system of claim 1, further comprising:

a linking status detecting module, which is capable of detecting whether each of the data storage units in the array-type data storage device is abnormally linked to one of the data access channels; and if yes, capable of generating a backup switching enable message to activate the switching control signal generating module to generate a corresponding set of switching control signals so as to activate the switching module to switch each abnormally-linked one of the data storage units from the currently-linked data access channel to the other one.

6. The data storage array linking operation switching control system of claim 1, wherein the first data access channel and the second data access channel are independent from each other and serve as backup to each other, and the array-type data storage device can be accessed concurrently via the first data access channel and the second data access channel.

7. A data storage array linking operation switching control system for use in conjunction with an array-type data storage device composed of a plurality of data storage units and connected to at least two data access channels including a first data access channel and a second data access channel, with the capability of selectively switching the linking between the data storage units in the array-type data storage device and the data access channels for the purpose of providing an intended linking mode selected from the group including a first linking mode, a second linking mode, and a third linking mode, wherein the third linking mode provides a higher performance than the second linking mode, and the second linking mode provides a higher performance than the first linking mode;

the data storage array linking operation switching control system comprising:

a mode selection module, which is used to select a desired mode from the group of the first linking mode, the second linking mode, and the third linking mode; wherein the first linking mode links all the data storage units in the array-type data storage device solely to the first data access channel but not to the second data access channel; the second linking mode links a first subgroup of the data storage units in the array-type data storage device to the first data access channel and a second subgroup of the same to the second data access channel; and the third linking mode links all the data storage units in the array-type data storage device concurrently to both the first data access channel and the second data access channel;

a switching control signal generating module, which is capable of generating a set of switching control signals based on the selected linking mode by the mode selection module;

a switching module, which is connected to each of the data storage units in the array-type data storage device, and which is capable of being activated in response to the switching control signals from the switching control signal generating module to accordingly link the data storage units in the array-type data storage device to the first data access channel and the second data access channel so as to allow the array-type data storage device to operate in the selected linking mode; and a linking status detecting module, which is capable of detecting whether each of the data storage units in the array-type data storage device is abnormally linked to one of the data access channels; and if yes, capable of generating a backup switching enable message to activate the switching control signal generating module to generate a corresponding set of switching control signals so as to activate the switching module to switch each abnormally-linked one of the data storage units from the currently-linked data access channel to the other one.

8. The data storage array linking operation switching control system of claim 7, wherein the array-type data storage device is a RAID (Redundant Array of Independent Disks) device.

9. The data storage array linking operation switching control system of claim 7, wherein the array-type data storage device is an array of FC (Fibre Channel Hard Disk Drive) units.

10. The data storage array linking operation switching control system of claim 7, wherein the first data access channel and the second data access channel are compliant with IPMI (Intelligent Platform Management Interface) standard.

11. The data storage array linking operation switching control system of claim 7, wherein the first data access channel and the second data access channel are independent from each other and serve as backup to each other, and the array-type data storage device can be accessed concurrently via the first data access channel and the second data access channel.

* * * * *